(12) United States Patent
Ueyama et al.

(10) Patent No.: US 12,442,865 B2
(45) Date of Patent: Oct. 14, 2025

(54) DIAGNOSTIC METHOD

(71) Applicant: SUBARU CORPORATION, Tokyo (JP)

(72) Inventors: Meiko Ueyama, Tokyo (JP); Hiroshi Abe, Tokyo (JP); Shun Kimijima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 366 days.

(21) Appl. No.: 17/971,122

(22) Filed: Oct. 21, 2022

(65) Prior Publication Data

US 2023/0133469 A1    May 4, 2023

(30) Foreign Application Priority Data

Nov. 4, 2021    (JP) .................. 2021-180443

(51) Int. Cl.
*G01R 31/392* (2019.01)
*G01R 31/36* (2020.01)
*G01R 31/3828* (2019.01)

(52) U.S. Cl.
CPC ....... *G01R 31/392* (2019.01); *G01R 31/3648* (2013.01); *G01R 31/3828* (2019.01)

(58) Field of Classification Search
CPC .............. G01R 31/3648; G01R 31/392; G01R 31/3828; H02J 7/005; Y02E 60/10
See application file for complete search history.

(56) References Cited

U.S. PATENT DOCUMENTS 11,411,421 B2 *  8/2022  Komiyama ............. H02J 7/005
2019/0044345 A1  2/2019  Komiyama et al.

FOREIGN PATENT DOCUMENTS

| JP | 2009-064682 A | 3/2009 |
| JP | 2013-045658 A | 3/2013 |
| JP | 2016-119249 A | 6/2016 |
| JP | 2018-156744 A | 10/2018 |
| JP | 2019-509593 A | 4/2019 |
| JP | 2019-145247 A | 8/2019 |
| JP | 2019-185969 A | 10/2019 |
| WO | 2018-074021 A1 | 4/2018 |

OTHER PUBLICATIONS

Office Action issued in Japanese Application No. 2021-180443 dated Jul. 29, 2025.

* cited by examiner

*Primary Examiner* — An H Do
(74) *Attorney, Agent, or Firm* — TROUTMAN PEPPER LOCKE LLP

(57) ABSTRACT

A diagnostic method to be implemented by a computer includes conducting a deterioration diagnosis of a dummy battery through which a mirror current based on a current flowing through a battery used as a power source for a drive motor flows; and, in a case where it is determined in the deterioration diagnosis that the dummy battery is deteriorated, conducting a reversible deterioration diagnosis of the dummy battery based on a usage state of the battery.

20 Claims, 3 Drawing Sheets

DIAGNOSTIC METHOD

CROSS-REFERENCE TO RELATED APPLICATION

The present application claims priority from Japanese Patent Application No. 2021-180443 filed on Nov. 4, 2021, the entire contents of which are hereby incorporated by reference.

TECHNICAL FIELD

The disclosure relates to a diagnostic method, and more particularly to a technique for diagnosing the deterioration of a battery provided in a vehicle.

BACKGROUND

For a battery, serving as a power source for a drive motor in a vehicle, and a dummy battery connected in series with the battery, there has been proposed a technique for determining the degree of deterioration of the battery by measuring the degree of deterioration of the dummy battery (see, for example, Japanese Unexamined Patent Application Publication (Translation of PCT Application) No. 2019-509593).

SUMMARY

An aspect of the disclosure provides a diagnostic method to be implemented by a computer. The diagnostic method includes: conducting a deterioration diagnosis of a dummy battery through which a mirror current based on a current flowing through a battery used as a power source for a drive motor flows; and, in a case where it is determined in the deterioration diagnosis that the dummy battery is deteriorated, conducting a reversible deterioration diagnosis of the dummy battery based on a usage mode of the battery.

DETAILED DESCRIPTION

Batteries serving as power sources for drive motors may experience a temporary capacity decrease when used at low temperatures and with high load currents, for example. When a deterioration diagnosis of a battery is conducted in the event of a temporary capacity decrease, the battery may be determined as being deteriorated despite the fact that the battery is not actually deteriorated.

It is desirable to improve the accuracy of determining the deterioration of a battery.

Figure 1:
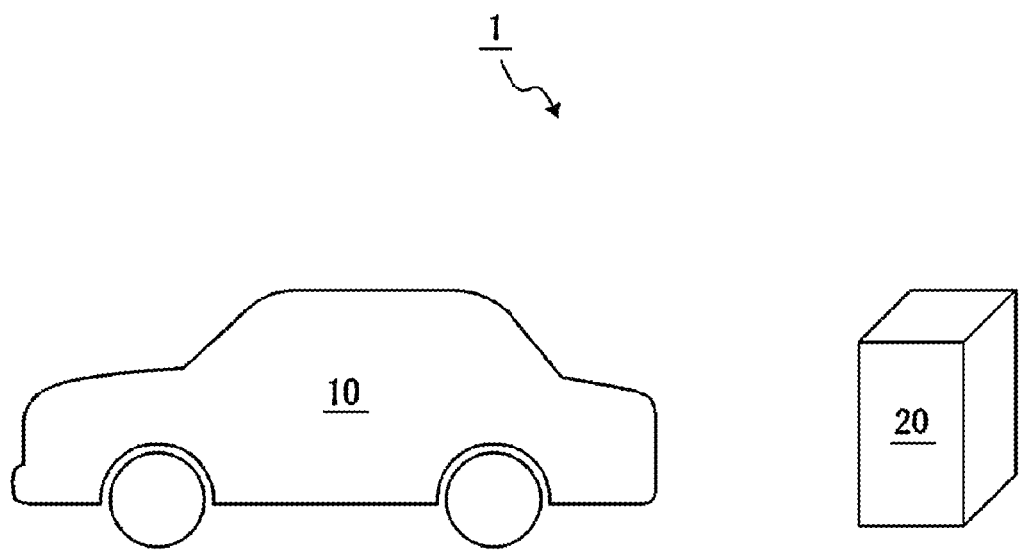
FIG. 1 is a diagram illustrating the configuration of a diagnostic system.

FIG. 1 is a diagram illustrating the configuration of a diagnostic system 1. As illustrated in FIG. 1, the diagnostic system 1 includes a vehicle 10 and a diagnostic apparatus 20.

The vehicle 10 is a hybrid vehicle driven by an engine and a drive motor, or an electric vehicle driven only by a drive motor. Hereinafter, the case where the vehicle 10 is an electric vehicle driven only by a drive motor will be described by way of example.

The diagnostic apparatus 20 indirectly diagnoses the deterioration of a battery 11 (see FIG. 2) provided in the vehicle 10 by diagnosing a dummy battery 14, as will be described in detail later.

Figure 2:
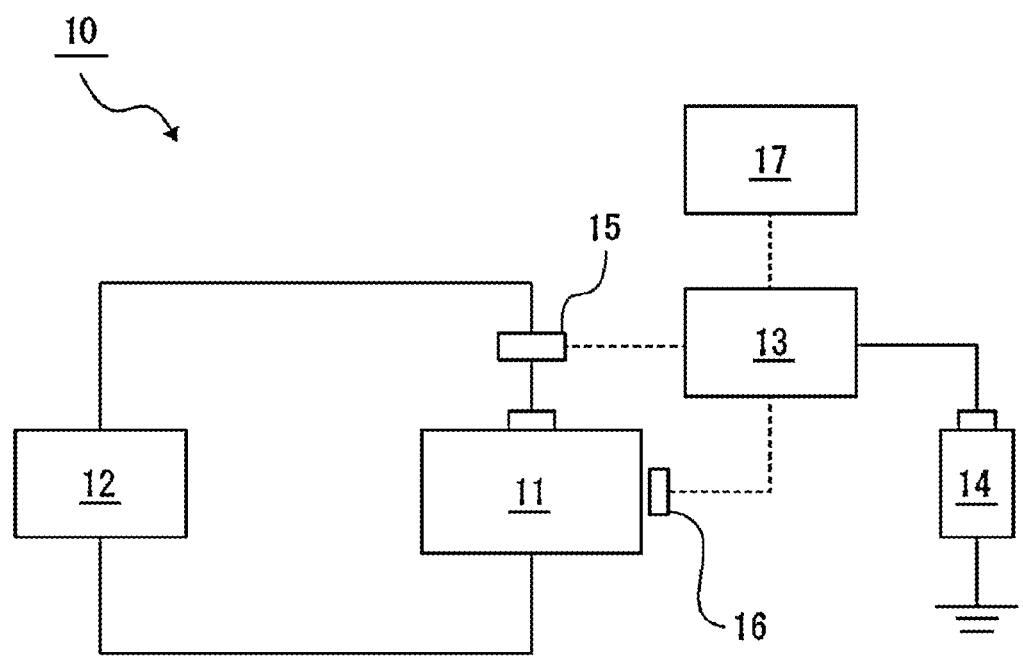
FIG. 2 is a diagram illustrating the configuration of a vehicle.

FIG. 2 is a diagram illustrating the configuration of the vehicle 10. In FIG. 2, an electric circuit is indicated by a solid line, and a signal circuit or a data communication circuit is indicated by a broken line.

As illustrated in FIG. 2, the vehicle 10 includes the battery 11, a drive motor 12, a battery control unit (BCU) 13, the dummy battery 14, an ammeter 15, a thermometer 16, and a communication unit 17.

The battery 11 is a lithium-ion secondary battery, for example, and is used as a power source for the drive motor 12. The battery 11 has cells (several tens of cells) with a rated output voltage of about several hundred V. Note that the battery 11 can be charged from an external power supply.

The drive motor 12 is a motor provided as a drive source for the wheels of the vehicle 10, and is operated by receiving power supply from the battery 11 via an inverter (not illustrated). In addition, the drive motor 12 may function as a generator when the vehicle 10 decelerates. The power generated by the drive motor 12 is regenerated to the battery 11 through the inverter.

The BCU 13 is configured with, for example, a microcomputer including a central processing unit (CPU), a read-only memory (ROM), and a random access memory (RAM). The BCU 13 performs control related to the power supply of the vehicle 10, that is, control related to the battery 11 and the dummy battery 14, when the CPU expands a program stored in the ROM into the RAM and executes the program.

The BCU 13 also includes a storage unit constituted of a non-volatile memory or the like, and various types of data may be stored in the storage unit. In addition, the BCU 13 is configured to be able to calculate the state of charge (SOC) of each of the battery 11 and the dummy battery 14. Note that, as an SOC calculation method, various methods of the related art, such as a method using an open circuit voltage (OCV)-SOC curve indicating the relationship between OCV and SOC, or a method using the integrated value of the current at the time of charging/discharging, may be used, and thus the detailed description thereof will be omitted here.

The dummy battery 14 is a lithium-ion secondary battery separate from the battery 11 and is provided as a diagnostic battery. The dummy battery 14 is a scaled down version of the battery 11, has one or more cells (several tens of cells), and a rated output voltage of about 5 V.

Moreover, the dummy battery 14 is configured as a battery in a separate housing from the battery 11. For example, the battery 11 is relatively firmly attached with bolts or the like under the floor of the compartment of the vehicle 10. In contrast, the dummy battery 14 is attached to a certain position in the vehicle 10 so as to be relatively easily removable through an attachment/detachment mechanism such as a hook.

The ammeter 15 measures the current value of a current charged/discharged from the battery 11 and outputs the measured current value to the BCU 13.

The thermometer 16 measures the temperature of the battery 11 or the ambient temperature of the battery 11, and outputs the measured temperature to the BCU 13. Note that the ambient temperature is the temperature of a space in which the battery 11 is provided, that is, the atmospheric temperature of the battery 11.

The communication unit 17 is connected with the BCU 13, and is connectable by wire to a vehicle diagnostic terminal (not illustrated). The communication unit 17 allows data transmission/reception to be performed between the BCU 13 and the vehicle diagnostic terminal.

The BCU 13 stores usage state data indicating the usage state of the battery 11 as needed. Note that the usage state of the battery 11 includes the state of the battery 11 in use, such as the environment in which the battery 11 is placed and/or how the battery 11 is used. In one example, the BCU 13 stores the current value measured by the ammeter 15, the temperature measured by the thermometer 16, and the SOC as usage state data in the storage unit at certain intervals.

The BCU 13 also generates a mirror current based on the current flowing through the battery 11. In one example, the BCU 13 generates a mirror current based on the current value of a current flowing through the battery 11, which is measured by the ammeter 15. Here, a "mirror current" refers to a current that changes in conjunction with the current flowing through the battery 11 in order to simulate the usage state of the battery 11 in the dummy battery 14.

As an example, it is conceivable to generate, with regard to the temperature of the battery 11 due to Joule heat, a mirror current so that the temperature of the battery 11 and the temperature of the dummy battery 14 become equal.

In one example, the BCU 13 generates a mirror current so as to satisfy the following condition: "(current of battery 11)$^2$×(heat capacity of battery 11)=(current of dummy battery 14)$^2$×(heat capacity of dummy battery 14)".

As another example, it is conceivable to generate a mirror current so that the SOC of the battery 11 and the SOC of the dummy battery 14 become equal.

In one example, the BCU 13 generates a mirror current so as to satisfy the following condition: "(current of battery 11)/(initial capacity of battery 11)=(current of dummy battery 14)/(initial capacity of dummy battery 14)".

Moreover, it is conceivable to generate a mirror current as having been given a coefficient corresponding to the difference in capacity or the like between the battery 11 and the dummy battery 14. In one example, in the case where the cell size or capacity of the dummy battery 14 is 1/10 of the cells of the battery 11, the BCU 13 generates, as a mirror current, a current with a current value that is 1/10 of the current value of a current flowing through the battery 11.

As described above, a mirror current may be any current as long as the usage state of the battery 11 is simulated in the dummy battery 14.

The BCU 13 allows the generated mirror current to flow through the dummy battery 14. By allowing the mirror current of a current flowing through the battery 11 to flow through the dummy battery 14, the usage state of the battery 11 is reproduced in the dummy battery 14. That is, the BCU 13 simulates the deterioration state of the battery 11 in the dummy battery 14.

Figure 3:
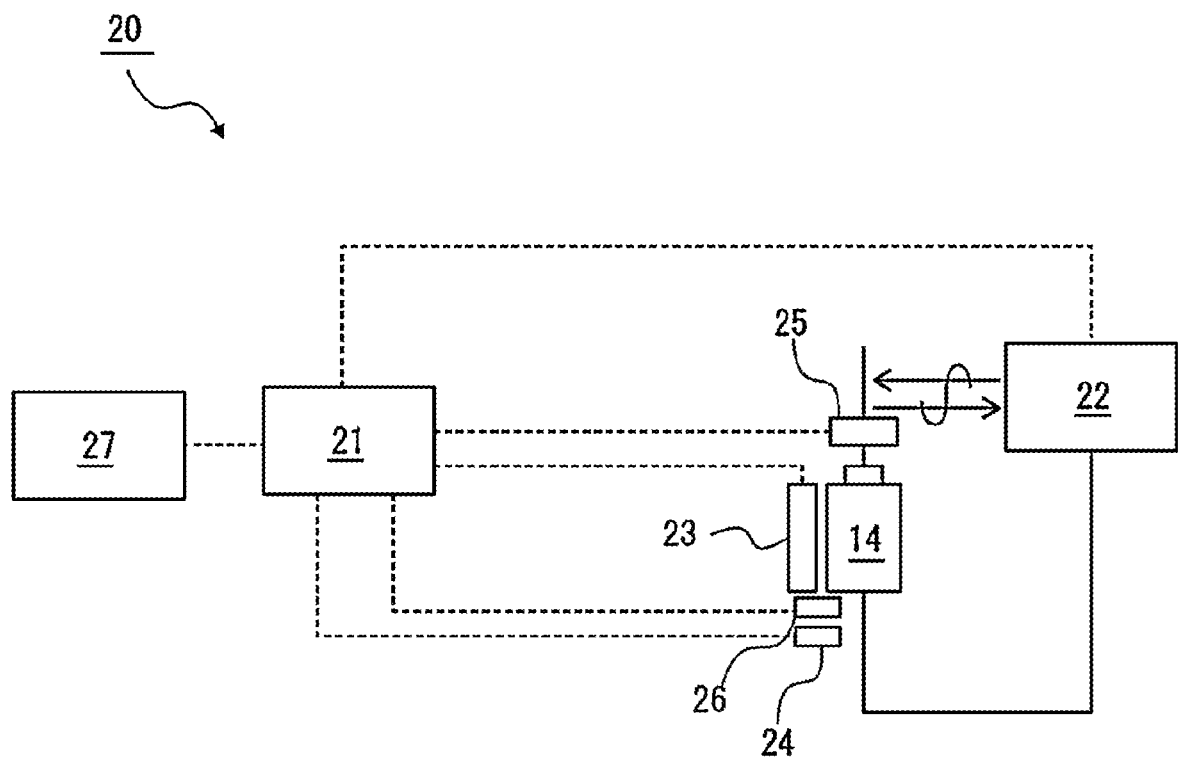
FIG. 3 is a diagram illustrating the configuration of a diagnostic apparatus.

FIG. 3 is a diagram illustrating the configuration of the diagnostic apparatus 20. In FIG. 3, an electric circuit is indicated by a solid line, and a signal circuit or a data communication circuit is indicated by a broken line.

As illustrated in FIG. 3, the diagnostic apparatus 20 includes a control unit 21, a charge/discharge device 22, a heater 23, a voltmeter 24, an ammeter 25, a thermometer 26, and a communication unit 27.

The control unit 21 is configured with, for example, a microcomputer including a CPU, ROM, and RAM, and controls each unit of the diagnostic apparatus 20 when the CPU expands a program stored in the ROM into the RAM and executes the program.

Under control of the control unit 21, the charge/discharge device 22 charges and discharges the dummy battery 14 removed from the vehicle 10.

Under control of the control unit 21, the heater 23 heats the dummy battery 14.

The voltmeter 24 measures the voltage value of the dummy battery 14 and outputs the measured voltage value to the control unit 21.

The ammeter 25 measures the current value of a current charged/discharged from the dummy battery 14 and outputs the measured current value to the control unit 21.

The thermometer 26 measures the temperature of the dummy battery 14 or the ambient temperature of the dummy battery 14, and outputs the measured temperature to the control unit 21.

The communication unit 27 is connected with the control unit 21 and is connected by wire to the vehicle diagnostic terminal (not illustrated). The communication unit 27 performs data transmission/reception between the control unit 21 and the vehicle diagnostic terminal.

When the dummy battery 14 is set in the diagnostic apparatus 20, the control unit 21 first conducts a deterioration diagnosis of the dummy battery 14.

For the sake of confirmation, a "deterioration diagnosis" here refers to, with regard to an evaluation index related to the deterioration state of a battery, at least comparing an evaluation index value serving as a reference and an actually measured evaluation index value.

Methods of the related art may be used for diagnosing the deterioration of a battery. Hereinafter, the case of conducting a diagnosis based on the capacity maintenance rate of a battery will be discussed by way of example.

The control unit 21 calculates the capacity maintenance rate Rc (%), which is indicated in equation (1) below, of the dummy battery 14 in a deterioration diagnosis based on the capacity maintenance rate:

"capacity maintenance rate $Rc$=current full charge capacity (Ah)/reference full charge capacity× 100". (1)

Note that the reference full charge capacity is, for example, a full charge capacity determined in advance to be used as a reference, such as a full charge capacity measured at the time of shipment from a factory (the initial full charge capacity of the dummy battery 14).

In addition, the full charge capacity in equation (1) is obtained by equation (2) below:

"full charge capacity (Ah)=cumulative amount of charge current (Ah)/(SOC after charge−SOC before charge)×100" (2)

Note that the SOC of the dummy battery 14 can be calculated based on the voltage value measured by the voltmeter 24.

Here, the dummy battery 14 is charged by the charge/discharge device 22. The control unit 21 calculates the above-mentioned capacity maintenance rate Rc in response to the fact that the dummy battery 14 has become fully charged, that is, the charging of the dummy battery 14 is completed, and conducts a deterioration diagnosis of the dummy battery 14 based on the capacity maintenance rate Rc.

As a deterioration diagnosis, the control unit 21 determines whether the capacity maintenance rate Rc is greater than or equal to a certain capacity threshold Th, for example. Note that the capacity threshold Th is set to a capacity maintenance rate at which the battery 11 is reusable, for example.

Here, if the capacity maintenance rate Rc is greater than or equal to the capacity threshold Th, it is determined that the dummy battery 14 is not deteriorated, that is, the battery 11 is not deteriorated and is reusable. In contrast, if the capacity maintenance rate Rc is less than the capacity threshold Th, it is determined that the dummy battery 14 is deteriorated, that is, the battery 11 is deteriorated and is not reusable.

Figure 4:
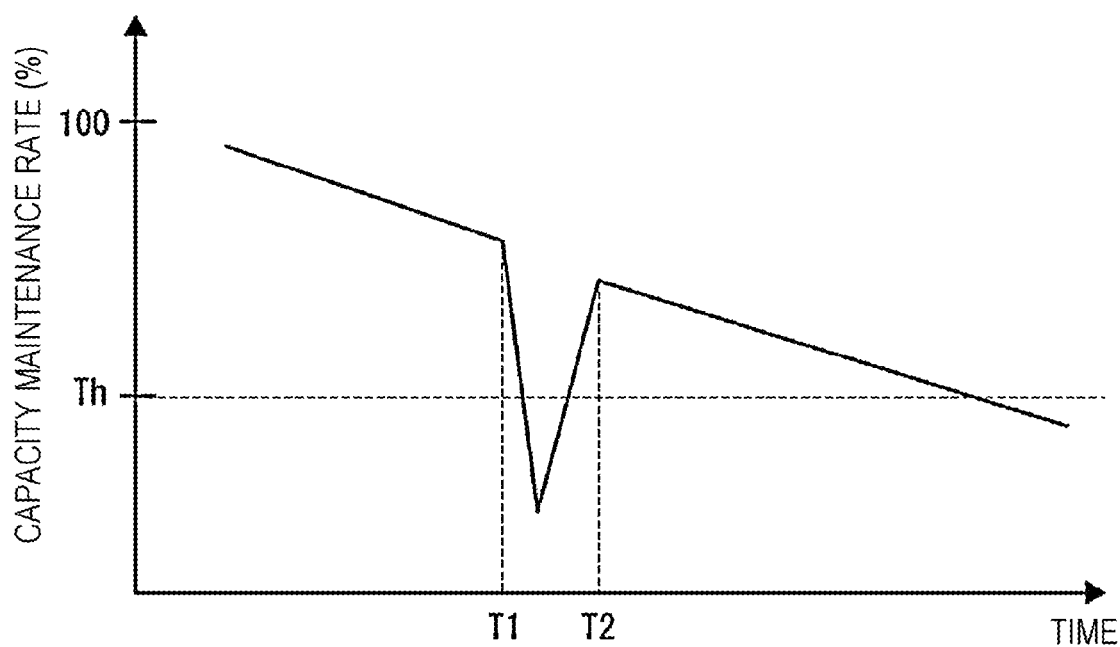
FIG. 4 is a graph illustrating a reversible deterioration of a battery.

FIG. 4 is a graph illustrating a reversible deterioration of the battery 11. By the way, when high-load currents frequently flow through the battery 11 at low temperatures, such as when slipping and gripping are frequently performed on frozen mountain roads, a reversible deterioration occurs.

A reversible deterioration is a phenomenon in which the battery 11 experiences a temporary decrease in capacity or increase in resistance, mainly because the charge is concentrated only on the surface of the negative electrode, making it difficult to accumulate electricity inside the battery 11. Such a reversible deterioration is gradually resolved over time.

For example, as illustrated in FIG. 4, suppose that a capacity decrease, which is one form of reversible deterioration, occurs in the battery 11 at time T1. Then, suppose that the capacity decrease in the battery 11 is resolved over time, and the capacity decrease is completely eliminated at time T2.

In such a case, suppose that the dummy battery 14 is removed from the vehicle 10 between time T1 and time T2 and a deterioration diagnosis is conducted. Then, because the dummy battery 14 is in the same usage state as the battery 11, the dummy battery 14 experiences a reversible deterioration, like the battery 11.

Therefore, when a deterioration diagnosis of the dummy battery 14 is conducted between time T1 and time T2, the capacity maintenance rate of the dummy battery 14 is determined to be less than the capacity threshold Th where the dummy battery 14 is not usable, for example. That is, the battery 11 is falsely determined to be not reusable due to a reversible deterioration.

Therefore, when it is determined that the dummy battery 14 is deteriorated in the deterioration diagnosis, the control unit 21 conducts a reversible deterioration diagnosis to determine whether there is a possibility that the dummy battery 14 is reversibly deteriorated based on the usage state of the battery 11.

In one example, the control unit 21 obtains usage state data from the vehicle 10 via the vehicle diagnostic terminal. Then, the control unit 21 determines whether there is a possibility that the dummy battery 14 is reversibly deteriorated by referring to a frequency map set in advance for the obtained usage state data.

Here, the frequency map defines a range within which a reversible deterioration can occur for three parameters: current value, temperature, and SOC. The control unit 21 counts the number of times the combination of the current value, temperature, and SOC stored in the usage state data is within the range specified in the frequency map. Then, the control unit 21 determines that the dummy battery 14 may be reversibly deteriorated when the counted value is greater than or equal to a preset count threshold.

When it is determined that the dummy battery 14 may be reversibly deteriorated, the control unit 21 conducts a deteriorated electrode diagnosis to determine a deteriorated electrode in the dummy battery 14.

In one example, the control unit 21 controls the charge/discharge device 22 to charge and discharge the dummy battery 14, during which a voltage value is measured by the voltmeter 24 and a current value is measured by the ammeter 25, and a charge/discharge curve (capacity and voltage) is calculated based on the voltage value and the current value. Moreover, the control unit 21 calculates a dQ/dV curve by taking the derivative of the charge/discharge curve.

It is known that whether the positive electrode or the negative electrode of a battery is deteriorated can be estimated based on the slope of the dQ/dV curve, that is, the charge/discharge curve. In one example, because the position (capacity) at which the charge/discharge curve changes abruptly during charging or discharging differs between the positive electrode deterioration and the negative electrode deterioration, whether the positive electrode or the negative electrode is deteriorated can be estimated based on the position (capacity) at which the charge/discharge curve changes abruptly.

Accordingly, the control unit 21 determines whether the positive electrode or the negative electrode is deteriorated based on the calculated dQ/dV curve.

When the negative electrode of the dummy battery 14 is deteriorated, because lithium ions are unevenly accumulated at the negative electrode of the dummy battery 14, the control unit 21 controls the charge/discharge device 22 to refresh discharge the dummy battery 14. Note that refresh discharging refers to forcibly discharging electricity accumulated in the dummy battery 14.

While the dummy battery 14 is being refresh discharged, the control unit 21 heats the dummy battery 14 with the heater 23 to about 60° C., for example. This can accelerate the reaction of the dummy battery 14.

In contrast, when the positive electrode of the dummy battery 14 is deteriorated, because lithium ions are unevenly detached from the positive electrode of the dummy battery 14, the control unit 21 controls the charge/discharge device 22 to refresh charge the dummy battery 14. Note that refresh charging refers to forcibly charging the dummy battery 14 with electricity.

While the dummy battery 14 is being refresh charged, the control unit 21 heats the dummy battery 14 with the heater 23 to about 60° C., for example. This can accelerate the reaction of the dummy battery 14.

As described above, the control unit 21 allows the dummy battery 14 to recover from a reversible deterioration by refresh discharging or refresh charging the dummy battery 14 according to the deteriorated electrode of the dummy battery 14.

After that, the control unit 21 again conducts a deterioration diagnosis of the dummy battery 14. Here, when the dummy battery 14 is reversibly deteriorated, it is determined that the capacity of the dummy battery 14 has recovered and the dummy battery 14 is not deteriorated. That is, the battery 11 is determined to be reusable.

In contrast, when the dummy battery 14 is not reversibly deteriorated, it is again determined that the dummy battery 14 is deteriorated because the capacity of the dummy battery 14 has not recovered. That is, the battery 11 is determined to be not reusable.

Figure 5:
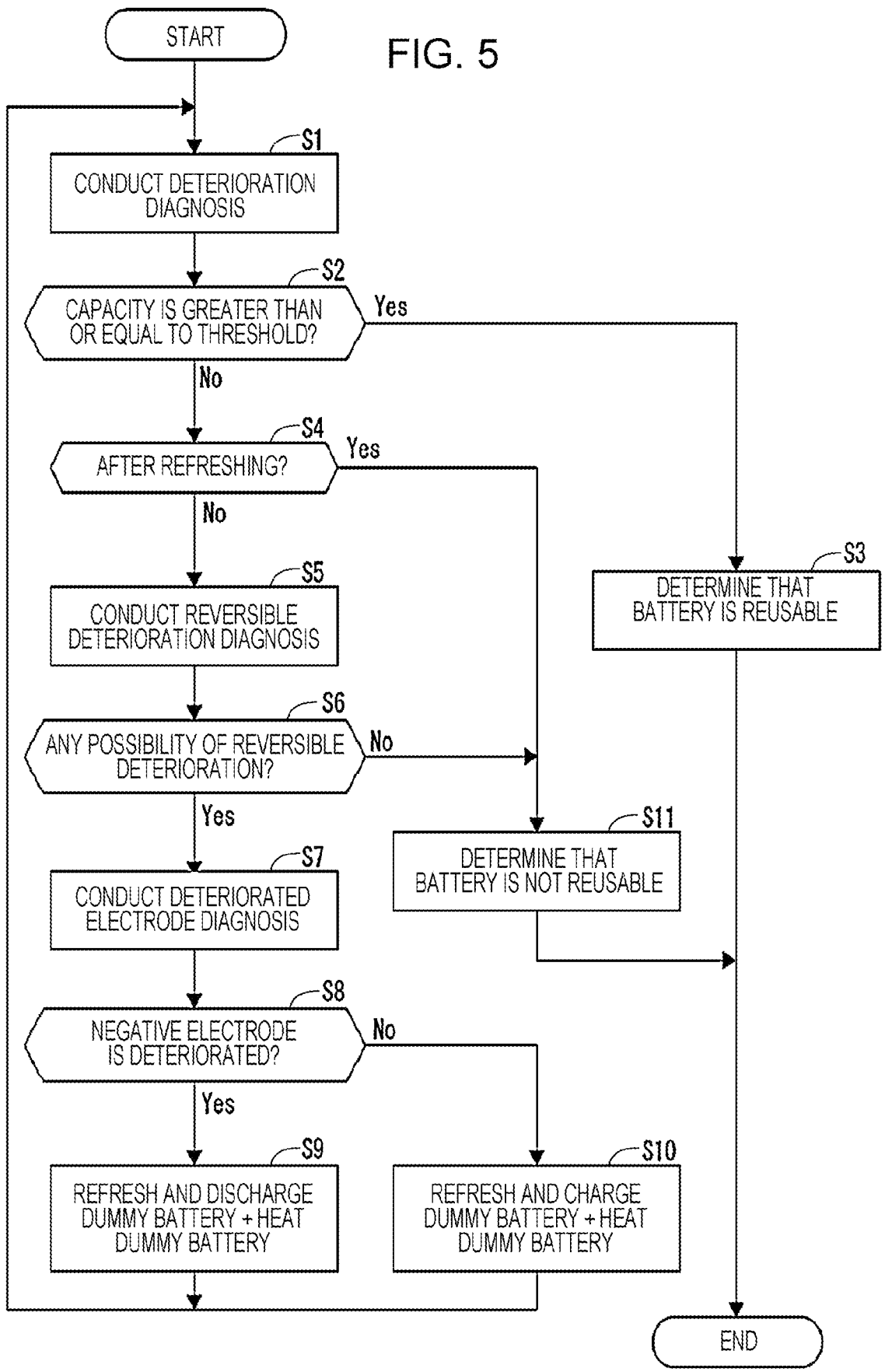
FIG. 5 is a flowchart illustrating the flow of a diagnostic process.

FIG. 5 is a flowchart illustrating the flow of a diagnostic process. Note that the process illustrated in FIG. 5 is executed by the control unit 21 based on a program stored in the ROM or the like.

As illustrated in FIG. 5, in step S1, the control unit 21 conducts a deterioration diagnosis of the dummy battery 14. In one example, the control unit 21 calculates a capacity maintenance rate using equation (1). Then, in step S2, the control unit 21 determines whether the capacity maintenance rate is greater than or equal to the capacity threshold Th.

In the case where the capacity maintenance rate is greater than or equal to the capacity threshold Th (Yes in step S2), the control unit 21 determines in step S3 that the battery 11 is reusable, and ends the process.

In contrast, in the case where the capacity maintenance rate is not greater than or equal to the capacity threshold Th (No in step S2), the control unit 21 determines in step S4 whether it is after the refresh discharging of the dummy battery 14 in step S9 described below or after the refresh charging of the dummy battery 14 in step S10 described below. Hereinafter, refresh discharging and refresh charging are collectively referred to as refreshing.

In the case where the dummy battery 14 is not after being refreshed (No in step S4), in step S5, the control unit 21 obtains the usage state data from the vehicle 10 via the vehicle diagnostic terminal, refers to the frequency map, and conducts a reversible deterioration diagnosis of the dummy battery 14.

Next, in step S6, the control unit 21 determines whether there is a possibility that the dummy battery 14 is reversibly deteriorated as a result of the reversible deterioration diagnosis in step S5. As a result, when there is a possibility that the dummy battery 14 is reversibly deteriorated (Yes in step S6), the control unit 21 conducts a deteriorated electrode diagnosis of the dummy battery 14 in step S7. In one example, the control unit 21 controls the charge/discharge device 22 to charge and discharge the dummy battery 14, calculates the charge/discharge curve and the dQ/dV curve during the charging and discharging, and determines whether the positive electrode or the negative electrode is deteriorated based on the calculated dQ/dV curve.

In step S8, the control unit 21 determines whether the negative electrode of the dummy battery 14 is deteriorated as a result of the deteriorated electrode diagnosis in step S7. As a result, in the case where the negative electrode of the dummy battery 14 is deteriorated (Yes in step S8), in step S9, the control unit 21 refresh discharges the dummy battery 14 and heats the dummy battery 14 with the heater 23.

In contrast, in the case where the negative electrode of the dummy battery 14 is not deteriorated (No in step S8), that is, in the case where the positive electrode of the dummy battery 14 is deteriorated, in step S10, the control unit 21 refresh charges the dummy battery 14 and heats the dummy battery 14 with the heater 23.

Then, in the case where the dummy battery 14 is refreshed in step S9 or step S10, the process returns to step S1.

In the case where the dummy battery 14 is after being refreshed (Yes in step S4), and in the case where there is no possibility that the dummy battery 14 is reversibly deteriorated (No in step S6), the control unit 21 determines in step S11 that the battery 11 is not reusable, and ends the process.

Here, the embodiment is not limited to the specific examples described above and can be configured in various modifications.

For example, it has been described above that a mirror current flowing through the dummy battery 14 is generated by software processing performed by the BCU 13. However, a mirror current can also be generated using an analog circuit such as a current mirror circuit, for example.

In the above embodiment, the case where the diagnostic apparatus 20 is provided separately from the vehicle 10 has been described. However, the diagnostic apparatus 20 may be provided in the vehicle 10, and a diagnostic process may be performed without removing the dummy battery 14.

In the above embodiment, if it is determined that there is a possibility that the dummy battery 14 is reversibly deteriorated, the dummy battery 14 is refresh discharged or refresh charged. However, the control unit 21 may only heat the dummy battery 14 with the heater 23 without refresh discharging or refresh charging the dummy battery 14. Moreover, the control unit 21 may neither refresh discharge or refresh charge the dummy battery 14 nor heat the dummy battery 14 with the heater 23. In such a case, however, in order for the dummy battery 14 to recover from a reversible deterioration, it is necessary to allow more time to elapse than in the case where refresh discharging or refresh charging is performed, and then to conduct a deterioration diagnosis again.

Although the temperature of the battery 11 is measured with the thermometer 16 in the above embodiment, the thermometer 16 may measure the temperature of the dummy battery 14.

In the above embodiment, the case where the vehicle 10 is connected to the diagnostic apparatus 20 via the vehicle diagnostic terminal has been described. However, the vehicle 10 and the diagnostic apparatus 20 may be connected by wire or wirelessly, or the usage state data may be uploaded to a cloud from the vehicle 10, and may be downloaded by the diagnostic apparatus 20.

In the above embodiment, the control unit 21 conducts a deterioration diagnosis based on the capacity maintenance rate of the dummy battery 14. However, the control unit 21 may conduct a deterioration diagnosis based on a resistance increase rate.

In a deterioration diagnosis based on a resistance increase rate, the resistance increase rate Rr (%), which is indicated in equation (3) below, of the dummy battery 14 is calculated:

$$\text{resistance increase rate } Rr = \text{latest battery resistance value } (\Omega)/\text{reference battery resistance value } (\Omega) \times 100 \quad (3)$$

The battery resistance value in equation (3) is calculated by equation (4) below:

$$\text{battery resistance value} = \text{average value of change in battery current}/\text{average value of change in voltage between two terminals of battery} \quad (4)$$

In this case, the control unit 21 calculates the battery resistance value of the dummy battery 14 using equation (4). That is, while the vehicle 10 is in operation, the control unit 21 obtains a current flowing through the dummy battery 14 for a certain period of time, and detection information of a voltage between two terminals, and calculates the battery resistance value of the dummy battery 14 in accordance with equation (4).

Note that, as the reference battery resistance value, like the reference full charge capacity mentioned above, a battery resistance value determined in advance to be used as a reference, such as a battery resistance value measured at the time of shipment from a factory (the initial battery resistance value of the dummy battery 14), is used.

Then, as a deterioration diagnosis, the control unit 21 determines whether the resistance increase rate Rr is greater than or equal to a certain threshold.

As described above, in a diagnostic method according to an embodiment, a computer (control unit 21) conducts a deterioration diagnosis of the dummy battery 14 through which a mirror current based on a current flowing through the battery 11 used as a power source for the drive motor 12 flows, and, if it is determined in the deterioration diagnosis that the dummy battery 14 is deteriorated, conducts a reversible deterioration diagnosis of the dummy battery 14 based on the usage mode of the battery 11.

Accordingly, even if it is determined in a deterioration diagnosis that the dummy battery 14 is deteriorated, the diagnostic apparatus 20 is able to determine whether there is a possibility that the capacity of the dummy battery 14 will recover by determining whether the dummy battery 14 is reversibly deteriorated.

Therefore, the diagnostic apparatus 20 is able to improve the accuracy of determining the deterioration of the battery 11.

In addition, if it is determined in a reversible deterioration diagnosis that the dummy battery 14 is reversibly deteriorated, the computer conducts a deteriorated electrode diagnosis of the dummy battery 14.

Accordingly, the diagnostic apparatus 20 is able to determine whether the cause of the reversible deterioration of the dummy battery 14 is the positive electrode deterioration or the negative electrode deterioration.

Thus, the diagnostic apparatus 20 is able to cause a recovery from a reversible deterioration at an early stage in accordance with the deteriorated electrode of the dummy battery 14.

In addition, the computer refresh discharges the dummy battery 14 when it is determined in a deteriorated electrode diagnosis that the negative electrode is deteriorated, and refresh charges the dummy battery 14 when it is determined in a deteriorated electrode diagnosis that the positive electrode is deteriorated.

Accordingly, the diagnostic apparatus 20 is able to cause a recovery from a reversible deterioration at an early stage in accordance with the deteriorated electrode of the dummy battery 14.

The computer also heats the dummy battery 14 while refresh discharging or refresh charging the dummy battery 14.

Accordingly, the diagnostic apparatus 20 is able to increase the reaction speed while refresh discharging or refresh charging the dummy battery 14.

Therefore, the diagnostic apparatus 20 is able to allow the dummy battery 14 to recover from a reversible deterioration at an early stage.

The computer also conducts a reversible deterioration diagnosis of the dummy battery 14 based on the current value, temperature, and SOC of the battery 11 or the dummy battery 14.

This enables the diagnostic apparatus 20 to determine a state of use in which a reversible deterioration is likely to occur, such as when in use at low temperatures and with high load currents.

The control unit 21 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control unit 21. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. A diagnostic method to be implemented by a computer, the diagnostic method comprising:
   receiving, from an ammeter, a current value of a current flowing through a battery used as a power source for a drive motor measured by the ammeter;
   generating a mirror current based on the current value measured by the ammeter, the mirror current simulating a usage state of the battery in a dummy battery;
   causing the mirror current to flow through the dummy battery to reproduce the usage state of the battery in the dummy battery;
   conducting a deterioration diagnosis of the dummy battery through which the mirror current flows;
   in a case where it is determined in the deterioration diagnosis that the dummy battery is deteriorated, conducting a reversible deterioration diagnosis of the dummy battery based on the usage state of the battery; and
   determining whether the battery is reusable based on the reversible deterioration diagnosis.

2. The diagnostic method according to claim 1, wherein, in a case where it is determined in the reversible deterioration diagnosis that the dummy battery is reversibly deteriorated, a deteriorated electrode diagnosis of the dummy battery is conducted.

3. The diagnostic method according to claim 2, wherein, in a case where it is determined in the deteriorated electrode diagnosis that a negative electrode of the dummy battery is deteriorated, the dummy battery is refresh discharged, and, in a case where it is determined in the deteriorated electrode diagnosis that a positive electrode of the dummy battery is deteriorated, the dummy battery is refresh charged.

4. The diagnostic method according to claim 2, wherein the reversible deterioration diagnosis of the dummy battery is conducted based on a current value, a temperature, and a state of charge of the battery or the dummy battery.

5. The diagnostic method according to claim 3, wherein the dummy battery is heated while being refresh discharged or being refresh charged.

6. The diagnostic method according to claim 3, wherein the reversible deterioration diagnosis of the dummy battery is conducted based on a current value, a temperature, and a state of charge of the battery or the dummy battery.

7. The diagnostic method according to claim 5, wherein the reversible deterioration diagnosis of the dummy battery is conducted based on a current value, a temperature, and a state of charge of the battery or the dummy battery.

8. The diagnostic method according to claim 1, wherein the reversible deterioration diagnosis of the dummy battery is conducted based on a current value, a temperature, and a state of charge of the battery or the dummy battery.

9. The diagnostic method according to claim 1, wherein the reversible deterioration diagnosis determines whether there is a possibility that the dummy battery is reversibly deteriorated based on the usage state of the battery.

10. The diagnostic method according to claim 9, the diagnostic method further comprising:
in a case where it is determined in the reversible deterioration diagnosis that there is no possibility that the dummy battery is reversibly deteriorated, determining that the battery is not reusable.

11. The diagnostic method according to claim 9, the diagnostic method further comprising:
in response to a determination that there is the possibility that the dummy battery is reversibly deteriorated in the reversible deterioration diagnosis, executing a refresh process on the dummy battery;
repeating a conducting of the deterioration diagnosis of the dummy battery after the refresh process;
in response to a determination that the dummy battery is deteriorated in the repeated deterioration diagnosis, determining that the battery is not reusable;
in response to a determination that the dummy battery is not deteriorated in the repeated deterioration diagnosis, determining that the battery is reusable; and
in response to a determination that there is no possibility that the dummy battery is reversibly deteriorated in the reversible deterioration diagnosis, determining that the battery is not reusable.

12. The diagnostic method according to claim 11, the diagnostic method further comprising:
heating the dummy battery to a predetermined temperature in the refresh process.

13. The diagnostic method according to claim 12, the diagnostic method further comprising:
receiving, from a thermometer, a temperature of the battery or an atmosphere when the battery is being used;
receiving a state of charge of the battery; and
storing the current value, the temperature, and the state of charge in memory as usage state data at predetermined time intervals,
wherein the usage state of the battery includes the usage state data.

14. The diagnostic method according to claim 11, the diagnostic method further comprising:
determining whether the dummy battery is deteriorated at a negative electrode or a positive electrode prior to executing the refresh process in response to the determination that there is the possibility that the dummy battery is reversibly deteriorated in the reversible deterioration diagnosis;
in response to a determination that the dummy battery is deteriorated at the negative electrode, conducting a refresh discharge of the dummy battery in the refresh process; and
in response to a determination that the dummy battery is deteriorated at the positive electrode, conducting a refresh charge of the dummy battery in the refresh process.

15. The diagnostic method according to claim 14, the diagnostic method further comprising:
heating the dummy battery to a predetermined temperature in the refresh process.

16. The diagnostic method according to claim 11, the diagnostic method further comprising:
receiving, from a thermometer, a temperature of the battery or an atmosphere when the battery is being used;
receiving a state of charge of the battery; and
storing the current value, the temperature, and the state of charge in memory as usage state data at predetermined time intervals,
wherein the usage state of the battery includes the usage state data.

17. The diagnostic method according to claim 9, the diagnostic method further comprising:
receiving, from a thermometer, a temperature of the battery or an atmosphere when the battery is being used;
receiving a state of charge of the battery; and
storing the current value, the temperature, and the state of charge in memory as usage state data at predetermined time intervals,
wherein the usage state of the battery includes the usage state data.

18. The diagnostic method according to claim 1, wherein a reversible deterioration indicates a temporary status of the dummy battery.

19. The diagnostic method according to claim 1, the diagnostic method further comprising:
receiving, from a thermometer, a temperature or an atmospheric temperature of the battery, the temperature or the atmospheric temperature indicating the usage state of the battery.

20. The diagnostic method according to claim 1, the diagnostic method further comprising:
receiving, via a communication unit, state of charge data of the battery, the state of charge data indicating the usage state of the battery.

* * * * *